US012298682B2

(12) United States Patent
Munetsugu

(10) Patent No.: US 12,298,682 B2
(45) Date of Patent: May 13, 2025

(54) IMAGE FORMING APPARATUS HAVING DEVELOPING APPARATUS WITH FILTER COVERING VENT OPENING AND SHUTTER TO SHIELD OPENING

(71) Applicant: CANON KABUSHIKI KAISHA, Tokyo (JP)

(72) Inventor: Hiroyuki Munetsugu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 19 days.

(21) Appl. No.: 18/506,876

(22) Filed: Nov. 10, 2023

(65) Prior Publication Data

US 2024/0160127 A1 May 16, 2024

(30) Foreign Application Priority Data

Nov. 14, 2022 (JP) ................................. 2022-181540

(51) Int. Cl.
*G03G 15/08* (2006.01)
*B65D 51/16* (2006.01)
*B65D 83/06* (2006.01)

(52) U.S. Cl.
CPC ..... *G03G 15/0886* (2013.01); *B65D 51/1616* (2013.01); *B65D 51/1683* (2013.01);
(Continued)

(58) Field of Classification Search
CPC ........... G03G 15/0865; G03G 15/0886; G03G 15/0874; G03G 2215/066;
(Continued)

(56) References Cited

U.S. PATENT DOCUMENTS 5,221,945 A * 6/1993 Smith ................ G03G 15/0882 222/DIG. 1
5,414,499 A * 5/1995 Yahata ............... G03G 15/0855 222/DIG. 1

(Continued)

FOREIGN PATENT DOCUMENTS

JP H07295355 A 11/1995
JP H08185046 A 7/1996

(Continued)

*Primary Examiner* — Robert B Beatty
(74) *Attorney, Agent, or Firm* — Canon U.S.A., Inc. IP Division

(57) ABSTRACT

A development apparatus to and from which a toner container is attachable and detachable includes a developing roller, a storage unit configured to store toner to be carried by the developing roller, an attachment unit to and from which the toner container is attachable and detachable and provided with a reception port for receiving toner from the toner container to the storage unit, an opening through which an inside of the storage unit and an outside of the storage unit communicate with each other, a filter configured to cover the opening, permit a passage of air and disturb a passage of toner, and a main unit shutter movable between a non-communication position and a communication position and configured to shield the opening when the main unit shutter is located at the non-communication position and open the opening when the main unit shutter is located at the communication position.

15 Claims, 10 Drawing Sheets

(52) U.S. Cl.
CPC ......... *B65D 83/06* (2013.01); *G03G 15/0865* (2013.01); *G03G 15/0874* (2013.01); *G03G 2215/066* (2013.01)

(58) Field of Classification Search
CPC ... G03G 2215/0678; G03G 2215/0682; B65D 51/1616; B65D 51/1683; B65D 83/06; B05B 11/00444
USPC ......... 399/258, 262; 222/92, 189.09, DIG. 1
See application file for complete search history.

(56) References Cited

U.S. PATENT DOCUMENTS

| | | | | | |
|---|---|---|---|---|---|
| 5,740,506 | A * | 4/1998 | Sundquist | G03G 15/0868 399/106 |
| 5,887,227 | A * | 3/1999 | Kawai | G03G 15/0126 399/119 |
| 2004/0197120 | A1* | 10/2004 | Yanagisawa | G03G 15/0865 399/258 |
| 2005/0105931 | A1* | 5/2005 | Foster | G03G 15/0865 399/262 |
| 2015/0220021 | A1* | 8/2015 | Leemhuis | G03G 15/0886 399/260 |
| 2020/0103788 | A1* | 4/2020 | Furukawa | G03G 15/0868 |
| 2022/0404738 | A1* | 12/2022 | Toba | G03G 15/0868 |
| 2022/0413414 | A1* | 12/2022 | Ozaki | G03G 15/0865 |
| 2023/0017354 | A1* | 1/2023 | Ozaki | G03G 15/087 |
| 2023/0096298 | A1* | 3/2023 | Sato | G03G 15/0886 399/260 |

FOREIGN PATENT DOCUMENTS

| | | | | |
|---|---|---|---|---|
| JP | 2013047714 | A | 3/2013 | |
| JP | 2021026218 | A | 2/2021 | |
| JP | 2021056431 | A | 4/2021 | |
| WO | WO-2020022585 | A1 * | 1/2020 | G03G 15/0865 |
| WO | 2022124422 | A1 | 6/2022 | |

* cited by examiner

IMAGE FORMING APPARATUS HAVING DEVELOPING APPARATUS WITH FILTER COVERING VENT OPENING AND SHUTTER TO SHIELD OPENING

BACKGROUND OF THE INVENTION

Field of the Invention

The present invention relates to an image forming apparatus.

Description of the Related Art

An external toner supply method is known as a toner supply method for an electrophotographic image forming apparatus. In the external toner supply method, a toner container is attached to an attachment unit on a development unit, and then toner is supplied from the toner container to the development unit in the image forming apparatus. Japanese Patent Application Laid-Open No. 2021-26218 discusses a configuration in which a user supplies toner by pressing a toner container from the outside.

SUMMARY OF THE INVENTION

According to an aspect of the present invention, a development apparatus to and from which a toner container is attachable and detachable includes a developing roller, a storage unit configured to store toner to be carried by the developing roller, an attachment unit to and from which the toner container is attachable and detachable and provided with a reception port for receiving toner from the toner container to the storage unit, an opening through which an inside of the storage unit and an outside of the storage unit communicate with each other, a filter configured to cover the opening, permit a passage of air and disturb a passage of toner, and a main unit shutter movable between a non-communication position where an inside of the toner container attached to the attachment unit does not communicate with the reception port and a communication position where the inside of the toner container attached to the attachment unit communicates with the reception port and configured to shield the opening when the main unit shutter is located at the non-communication position and open the opening when the main unit shutter is located at the communication position.

Further features of the present invention will become apparent from the following description of exemplary embodiments with reference to the attached drawings.

DESCRIPTION OF THE EMBODIMENTS

An illustrative exemplary embodiment of the present invention will be described below with reference to the accompanying drawings.

Exemplary embodiments of the present invention will be described in detail below based on the accompanying drawings.

<Image Forming Apparatus>

Figure 2A:
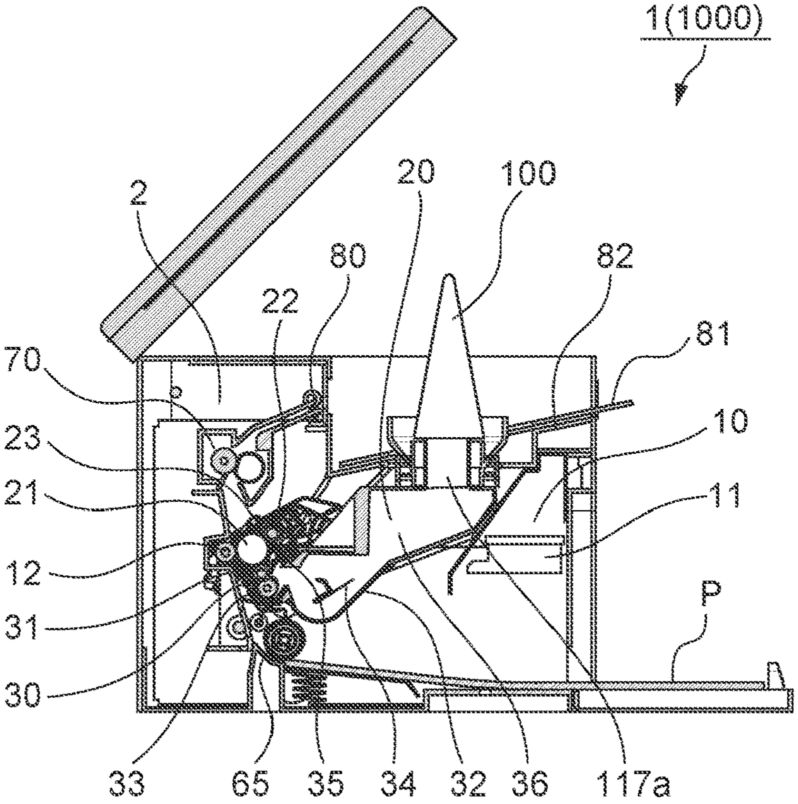
FIGS. 2A and 2B are a cross-sectional view and a perspective view, respectively, illustrating an image forming apparatus.

FIG. 2A schematically illustrates a configuration of an image forming apparatus 1 according to a first exemplary embodiment. The image forming apparatus 1 is a monochrome printer that forms an image on a recording material P based on image information input from an external apparatus. Examples of recording materials P include various types of sheet materials such as plain paper, plastic films (such as overhead projector sheets), specially shaped sheets (such as envelopes and index paper), and other types of sheets made of different materials (such as cloths).

Figure 2B:
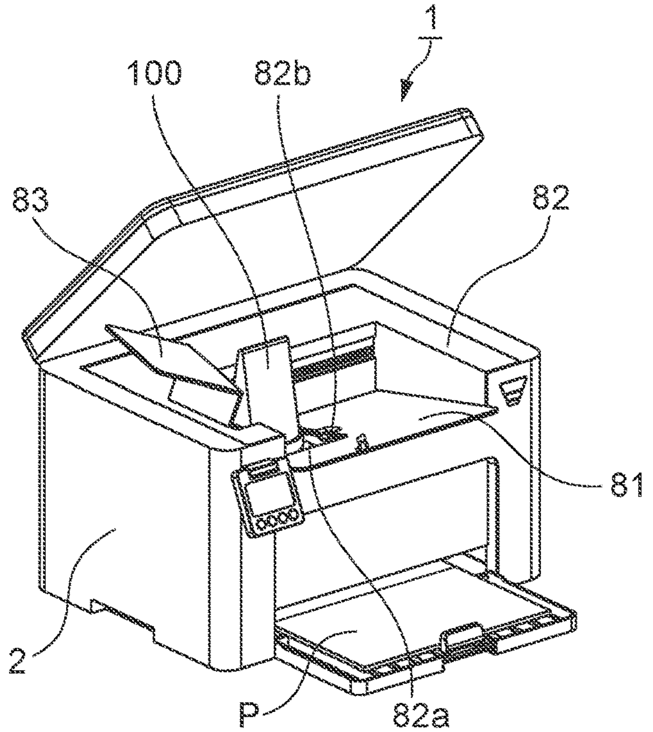

As illustrated in FIGS. 2A and 2B, a printer main body 2 as the apparatus body includes an image forming unit 10 for forming a toner image on a recording material P, a pickup roller 65 for feeding the recording material P to the image forming unit 10, a fixing unit 70 for fixing the toner image formed by the image forming unit 10 to the recording material P, and a pair of discharge rollers 80.

The image forming unit 10 includes a scanner unit 11, an electrophotographic process unit 20, and a transfer roller 12 for transferring the toner image as a developer image formed on a photosensitive drum 21 of the process unit 20 to the recording material P. The process unit 20 includes the photosensitive drum 21, and a development apparatus 30 (development unit) including a charging roller 22, a pre-exposure apparatus 23, and a developing roller 31 disposed around the photosensitive drum 21.

The photosensitive drum 21 as an image carrier is a cylindrically formed photosensitive member. The photosensitive drum 21 according to the present exemplary embodiment includes a photosensitive layer formed of an organic photosensitive member having the negative chargeability on a drum-like base made of aluminum. The photosensitive drum 21 is rotatably driven at a predetermined process speed in a predetermined direction (clockwise direction in FIGS. 2A and 2B) by a motor.

The charging roller 22 comes into contact with the photosensitive drum 21 with a predetermined contact pressure to form a charging portion. When a desired charging voltage is applied to the surface of the photosensitive drum 21 by a charging high-voltage power source, the surface of the photosensitive drum 21 is uniformly charged to a predetermined potential. According to the present exemplary embodiment, the photosensitive drum 21 is charged to the negative polarity by the charging roller 22. The pre-exposure apparatus 23 neutralizes the surface potential of the photosensitive drum 21 before the photosensitive drum 21 enters the charging portion, so that stable electric discharge is caused at the charging portion.

The scanner unit 11 as an exposure unit scans the surface of the photosensitive drum 21 for exposure by irradiating the photosensitive drum 21 with a laser beam by using a polygon mirror. The laser beam corresponds to the image information input from an external apparatus. Through this exposure, an electrostatic latent image corresponding to the image information is formed on the surface of the photosensitive drum 21. The scanner unit 11 is not limited to a laser scanner apparatus. For example, there may be employed a light emitting diode (LED) exposure apparatus having a LED array formed of a plurality of LEDs arranged along the longitudinal direction of the photosensitive drum 21.

The development apparatus 30 includes the developing roller 31 as a developer carrier for carrying a developer, a developing container 32 as a frame of the development apparatus 30, and a feed roller 33 for supplying the developer to the developing roller 31. The developing roller 31 and the feed roller 33 are rotatably supported by the developing container 32. The developing roller 31 is disposed at the opening of the developing container 32 to face the photosensitive drum 21. The feed roller 33 is rotatably in contact with the developing roller 31, and the toner as a developer stored in the developing container 32 is applied to the surface of the developing roller 31 by the feed roller 33. If the toner can be sufficiently supplied to the developing roller 31, the feed roller 33 is not necessarily required.

A contact development method is used as a development method for the development apparatus 30 according to the present exemplary embodiment. More specifically, a toner layer carried by the developing roller 31 comes into contact with the photosensitive drum 21 at a development portion (development region) where the photosensitive drum 21 and the developing roller 31 faces each other. A developing voltage is applied to the developing roller 31 by a developing high-voltage power source. When the toner carried by the developing roller 31 is transferred from the developing roller 31 to the surface of the photosensitive drum 21 according to the potential distribution on the surface of the photosensitive drum 21 under the developing voltage, the electrostatic latent image is developed into a toner image. According to the present exemplary embodiment, the reversal development method is used. More specifically, after the photosensitive drum 21 is charged in the charging process and then exposed in the exposure process, toner adheres to surface areas on the photosensitive drum 21 with the decreased charge amount, thus forming a toner image.

According to the present exemplary embodiment, toner having a particle size of 6 μm and a regular negative charging polarity is used. According to the present exemplary embodiment, for example, polymerised toner generated by the polymerization method is used. The toner according to the present exemplary embodiment is what is called non-magnetic one-component developer containing no magnetic component. The toner is carried by the developing roller 31 mainly through the intermolecular force and electrostatic force (image force). One-component developers containing magnetic components are also applicable. In addition to toner particles, a one-component developer may contain additives (e.g., wax and silica microparticles) for adjusting the flowability and charging performance of the toner. A two-component developer containing non-magnetic toner and magnetic carriers is applicable as a developer. When a magnetic developer is used, for example, a cylindrical developing sleeve incorporating magnets is used as a developer carrier.

The developing container 32 includes a toner storage chamber 36 (second storage unit) for storing toner and a stirring member 34 as a stirring unit disposed in the toner storage chamber 36. When the stirring member 34 is driven to rotate by a motor (not illustrated), the stirring member 34 stirs the toner in the developing container 32 and sends the toner to the developing roller 31 and the feed roller 33 at the same time. The stirring member 34 has a role of circulating toner unused for development and scratched from the developing roller 31, in the developing container 32 to uniformize the toner in the developing container 32. A form of the stirring member 34 is not limited to a rotating form. For example, a stirring member having a swinging form is also applicable.

The opening of the developing container 32 where the developing roller 31 is disposed is provided with a developing blade 35 for regulating the amount of toner to be carried by the developing roller 31. When the toner supplied on the surface of the developing roller 31 passes through the portion facing the developing blade 35 with the rotation of the developing roller 31, the toner is uniformly thinned and charged to the negative polarity by the triboelectric charging.

An image forming operation of the image forming apparatus 1 will be described below. When an image forming command is input to the image forming apparatus 1, the image forming unit 10 starts an image forming process based on the image information input from an external computer connected with the image forming apparatus 1. The scanner unit 11 irradiates the photosensitive drum 21 with a laser beam based on the input image information. In this case, when the photosensitive drum 21 pre-charged by the charging roller 22 is irradiated with a laser beam, an electrostatic latent image is formed on the photosensitive drum 21. Then, the electrostatic latent image is developed by the developing roller 31, and a toner image is formed on the photosensitive drum 21.

In parallel with the above-described image forming process, the recording material P is sent out by the pickup roller 65 and then conveyed toward a transfer nip formed between the transfer roller 12 and the photosensitive drum 21.

A transfer voltage is applied to the transfer roller 12 by a transfer high-voltage power source, and the toner image carried by the photosensitive drum 21 is transferred to the recording material P. When the recording material P with the toner image transferred thereto passes through the fixing unit 70, the toner image is heated and pressurized. Accordingly, toner particles are melted and then firmly fixed, and the toner image is fixed to the recording material P. The recording material P having passed through the fixing unit 70 is discharged out of the image forming apparatus 1 by the pair of discharge rollers 80 as a discharge unit and then stacked on a discharge tray 81 as a stacking unit formed at the upper part of the printer main body 2.

Figure 3:
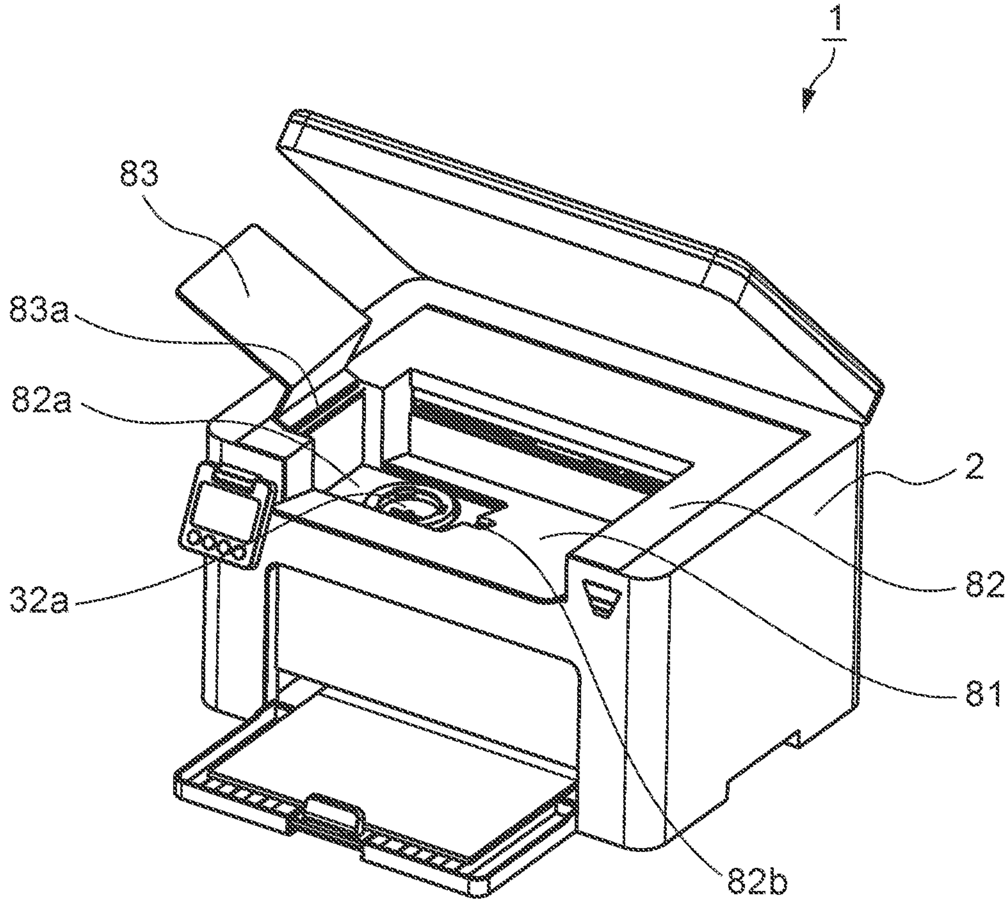
FIG. 3 is a perspective view illustrating the image forming apparatus in a state where an opening/closing member is open.

A top cover 82 as a stacking tray is provided at the upper part of the printer main body 2. The discharge tray 81 as a stacking surface is formed on the upper surface of the top cover 82. As illustrated in FIGS. 2B and 3, an opening/closing member 83 is openably and closably supported by the top cover 82 around a pivot axis 83*a* extending in an anteroposterior direction. An opening 82*a* upwardly opened is formed on the discharge tray 81 of the top cover 82.

The opening/closing member 83 is configured to be movable between two different positions. One is a closed position where the opening/closing member 83 covers an attachment unit 32*a* so that a toner pack 100 as a toner container cannot be attached to the developing container 32, and the other is an open position where the attachment unit 32*a* is exposed so that the toner pack 100 can be attached to the developing container 32.

When the opening/closing member 83 is located at the closed position, the opening/closing member 83 functions as a part of the discharge tray 81. The opening/closing member 83 and the opening 82*a* are formed on the left-hand side of the discharge tray 81. The opening/closing member 83 is leftwardly opened by the user who puts a finger into a groove 82*b* on the top cover 82. The opening/closing member 83 is formed in an approximate L-shape along the shape of the top cover 82.

The opening 82*a* of the discharge tray 81 opens so that the attachment unit 32*a* for toner supply formed at the upper part of the developing container 32 is exposed. When the opening/closing member 83 is opened, the user can access the attachment unit 32*a*. According to the present exemplary embodiment, a method (direct supply method) is used for supplying toner from the toner pack 100 (see FIGS. 2A and 2B) filled with supplementary toner to the development apparatus 30 in a state where the process unit 20 (development apparatus 30) is attached to the image forming apparatus 1. In a state where the toner pack 100 is attached to the image forming apparatus 1, at least a part of the toner pack 100 is exposed out of the image forming apparatus 1.

The use of the direct supply method eliminates the need of detaching the process unit 20 out of the printer main body 2 and replacing the process unit 20 with a new one when the remaining amount of toner in the process unit 20 has decreased. This enables improving the usability for toner supply. This method enables supplying toner to the developing container 32 at a lower cost than that in a case of replacing the process unit 20. The direct supply method eliminates the need of replacing various rollers and gears, attaining cost reduction, in comparison with a case of replacing only the development apparatus 30 of the process unit 20. The image forming apparatus 1 and the toner pack 100 are included in an image forming system 1000.

<Toner Receiving Unit>

A configuration of a toner receiving unit 106 will be described below with reference to FIGS. 4 and 5. According to the present exemplary embodiment, the toner receiving unit 106 is included in the attachment unit 32*a* to and from which the toner pack 100 is attached and detached. The attachment unit 32*a* includes a first frame 107 of the toner receiving unit 106, a main unit shutter 109 (base member), an operation lever 108, and a cover member 110. The attachment unit 32*a* will be described in detail below.

Figure 4:
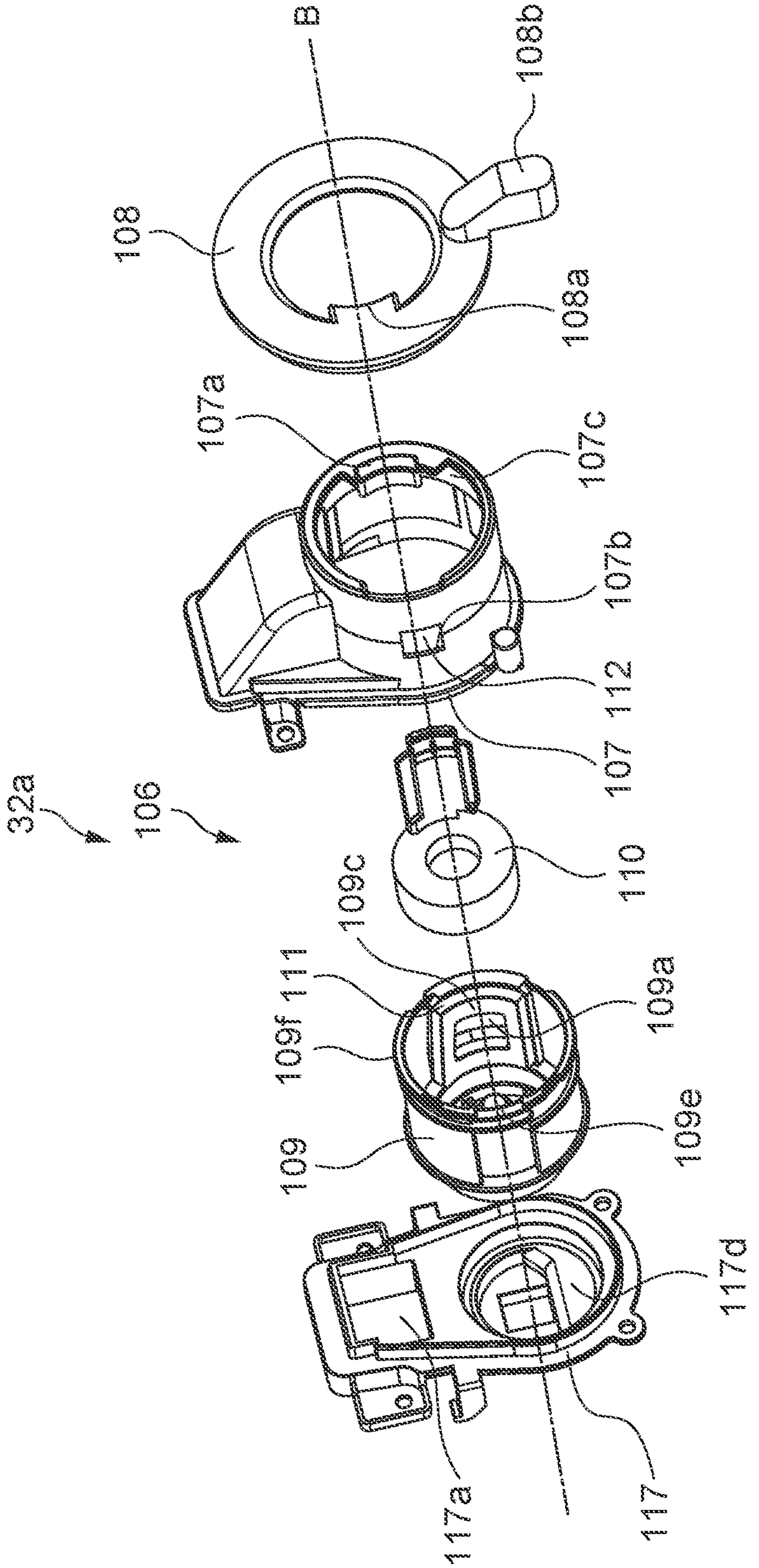
FIG. 4 is an exploded perspective view illustrating the toner receiving unit.
Figure 5A:
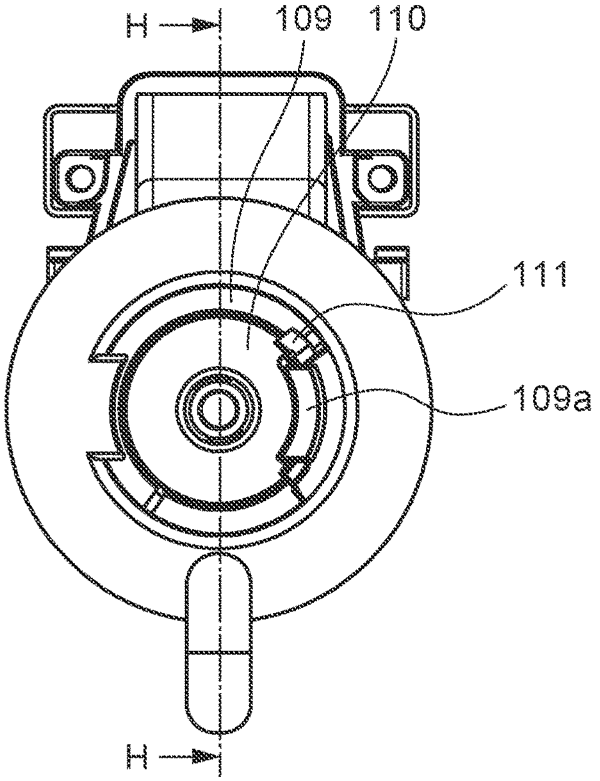
FIGS. 5A and 5B are top views illustrating an operation lever and the toner receiving unit.
Figure 5B:
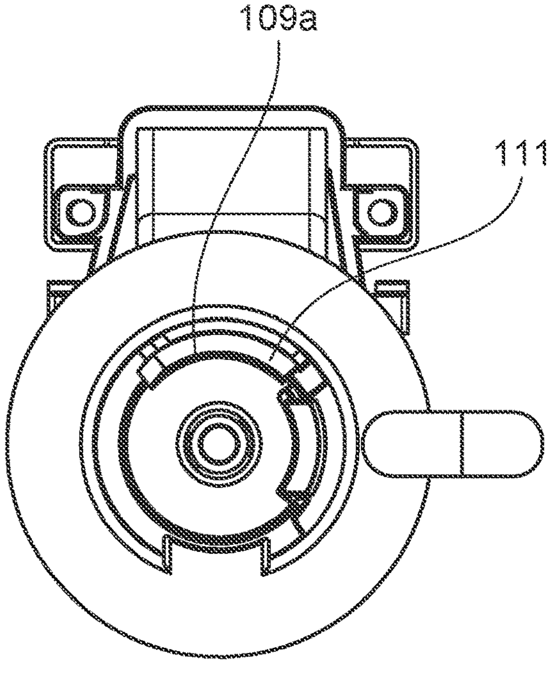

FIG. 4 is an exploded perspective view illustrating the toner receiving unit 106. FIG. 5A is a top view illustrating the toner receiving unit 106 in a state where the main unit shutter 109 is closed. FIG. 5B is a top view illustrating the toner receiving unit 106 in a state where the main unit shutter 109 is opened.

As illustrated in FIG. 4, the attachment unit 32*a* includes the toner receiving unit 106. The toner receiving unit 106 includes the first frame 107, the main unit shutter 109, the operation lever 108, the cover member 110, and a second frame 117.

The cover member 110 and the second frame 117 are fixed to the first frame 107. The first frame 107 is provided with a through-hole 107*b* (opening) and a vent sheet flange 107*d* (see FIG. 1A). A vent sheet 112 (filter) is thermally welded to the vent sheet flange 107*d* on the inner surface of the first frame 107 to cover the through-hole 107*b*. The vent sheet 112 is made of a material such as a non-woven fabric. The vent sheet 112 is configured to permit the passage of air and disturb the passage of toner. The vent sheet flange 107*d* is disposed outside the first frame 107, and the vent sheet 112 is welded outside the first frame 107.

The adhesion method of the vent sheet 112 is not limited to the thermal welding but may be a fixing method using an adhesive agent or two-sided adhesive tape.

The operation lever 108 is provided with a drive transfer portion 108*a* (first engaging portion) and an operating portion 108*b*. The main unit shutter 109 is provided with a main unit shutter opening 109*a*, a driven transfer portion 109*e* (first engaged portion), and an outer periphery cylindrical surface 109*f*. A main unit seal 111 is stuck around the main unit shutter opening 109*a*. The second frame 117 is provided with a reception port 117*a* communicating with the toner storage chamber 36 (see FIG. 2A). The main unit shutter 109 is slidably supported by the outer periphery cylindrical surface 109*f* and an inner periphery cylindrical surface 107*c* of the first frame 107. The rotational axis is defined as a rotational axis B. A shielding member 120 is fixed to a concave portion 109*g* of the main unit shutter 109 via the auxiliary member of a two-sided adhesive tape 122 (see FIG. 1A). The shielding member 120 is made of rubber, sponge (elastic member made of polyurethane (PU), polyolefin polyethylene (PE), and ethylene-propylene rubber (EPDM) (RS)) or non-woven fabric. The main unit shutter 109 and the shielding member 120 are collectively referred to as moving members.

The main unit shutter 109, which is rotatable around the rotational axis B, is configured to move between two different positions. One is a first position (first shielding position or non-communication position) where the main unit seal 111 illustrated in FIG. 5A prevents the main unit shutter opening 109*a* from communicating with the reception port 117*a*, and the other is a second position (first open position or communication position) where the main unit shutter opening 109*a* illustrated in FIG. 5B communicates with the reception port 117*a*. The shielding member 120 fixed to the main unit shutter 109 also rotates around the rotational axis B together with the main unit shutter 109.

<Toner Pack>

The configuration of the toner pack 100 as a toner container will be described below with reference to FIGS. 6 and 7.

Figure 6:
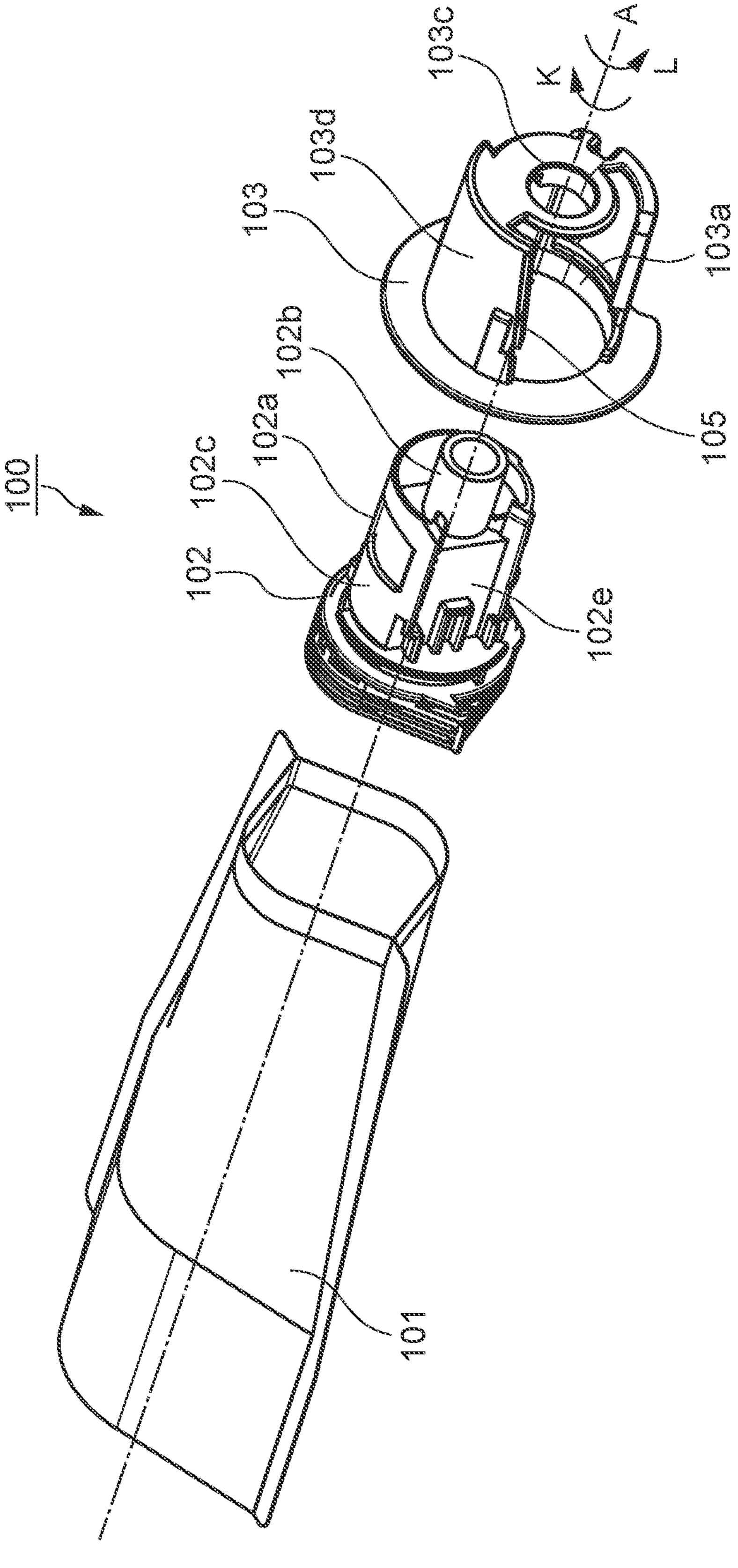
FIG. 6 is an exploded perspective view illustrating a toner pack.

As illustrated in FIG. 6, the toner pack 100 is provided with a storage unit 101 (first storage unit) for storing toner at one end (first end side) along the rotational axis A (first direction).

According to the present exemplary embodiment, the storage unit 101 is formed by pouch processing using a flexible polypropylene sheet.

On the other hand, the toner pack 100 is provided with a nozzle 102 (nozzle unit or discharge unit) at the other end (second end side) along the rotational axis A. A side surface (first outer surface or wall surface) 102*c* of the nozzle 102 extending along the direction of the rotational axis A is provided with a discharge port 102*a* that communicates with the inside of the storage unit 101 to discharge the toner stored in the storage unit 101 to the outside.

Figure 7A:
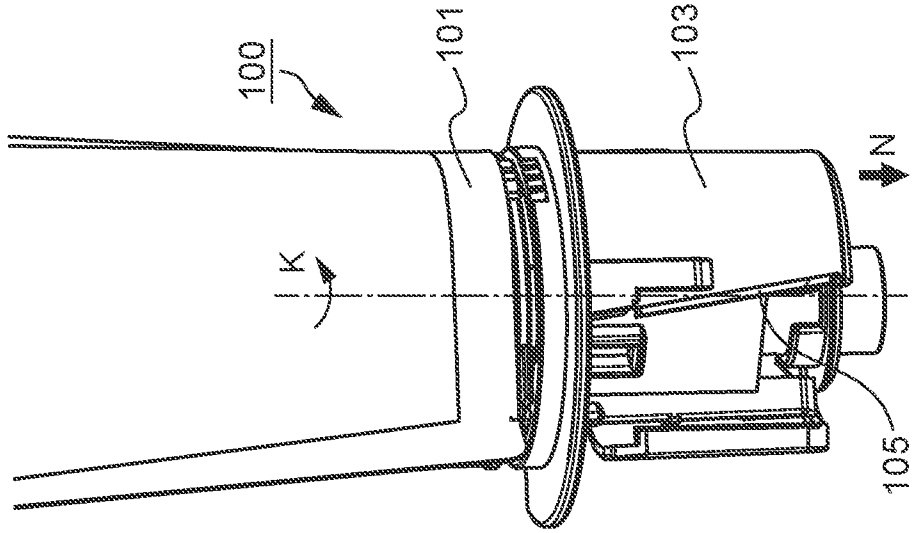
FIGS. 7A and 7B are perspective views illustrating the opening and closing of a container shutter.
Figure 7B:
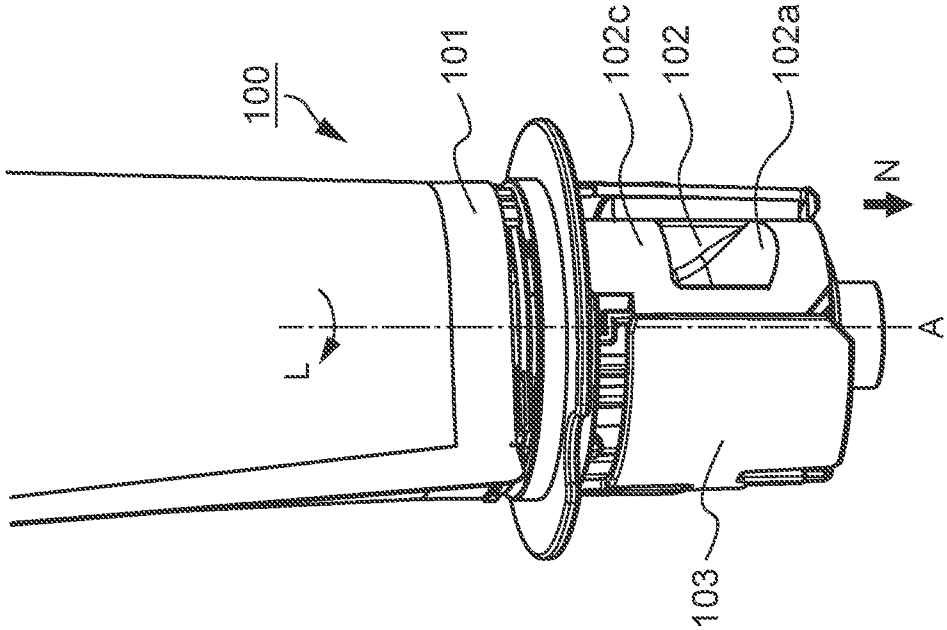

A pivot container shutter 103 (rotary member) is attached to the nozzle 102 so that the shutter 103 is rotatable (in the directions of the arrows K and L) around the rotational axis A. A pack seal 105 having an approximately rectangular shape is attached to the container shutter 103 rotating around the rotational axis A between two different positions. One is a third position (second shielding position) where the pack seal 105 shields the discharge port 102*a*, and the other is a fourth position (second open position) where the discharge port 102*a* is opened. As illustrated in FIG. 7A, when the container shutter 103 located at the third position is rotated in the direction of the arrow K around the rotational axis A, the container shutter 103 is moved to the fourth position illustrated in FIG. 7B. Conversely, when the container shutter 103 located at the fourth position is rotated in the direction of the arrow L, the container shutter 103 is moved to the third position.

As illustrated in FIG. 6, the nozzle 102 is provided with a concave portion 102*e*. The nozzle 102 is further provided with a container shutter opening 103*a* on a side surface 103*d* of the container shutter 103 more outwardly positioned than the side surface 102*c* when viewed from the direction of the rotational axis A (see FIG. 6). As illustrated in FIG. 7A, when the container shutter 103 is located at the third position, the concave portion 102*e* of the nozzle 102 is exposed from the container shutter opening 103*a*.

<Toner Pack Attachment and Lever Operation>

The attachment of the toner pack 100 to the toner receiving unit 106 and an operation of the operation lever 108 will be described below with reference to FIGS. 8 and 9.

Figure 8B:
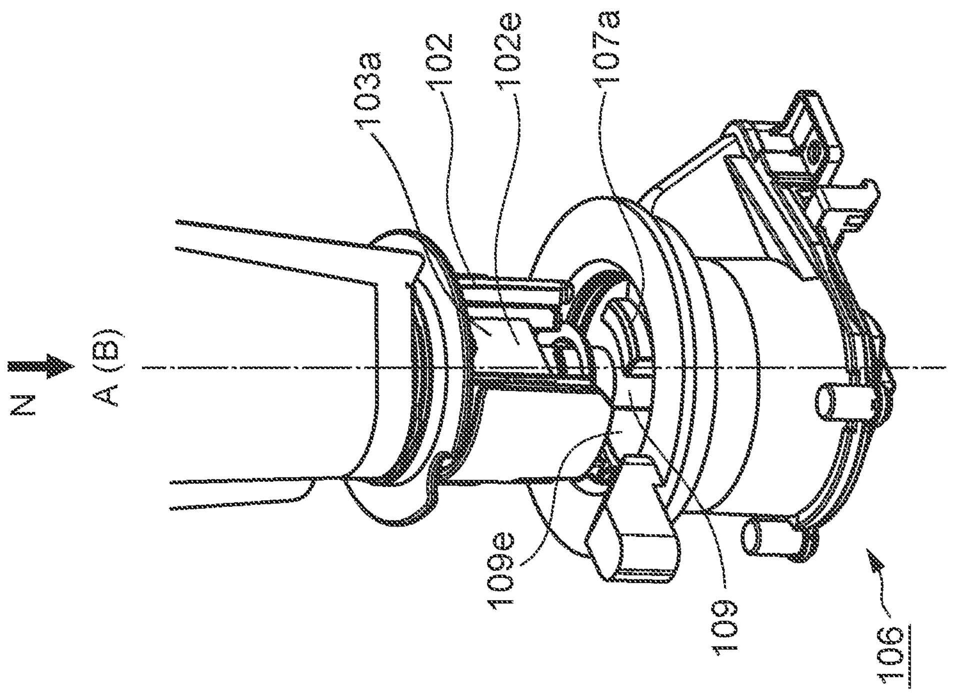
FIGS. 8A and 8B are perspective views illustrating the toner pack, the operation lever, and the toner receiving unit when the toner pack is attached.
Figure 8A:
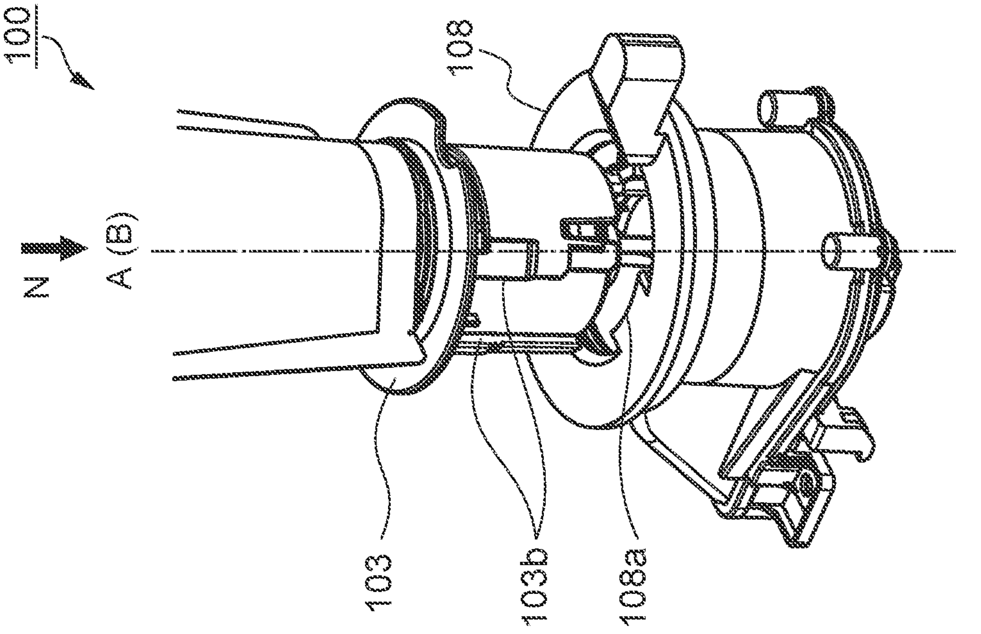
Figure 9:
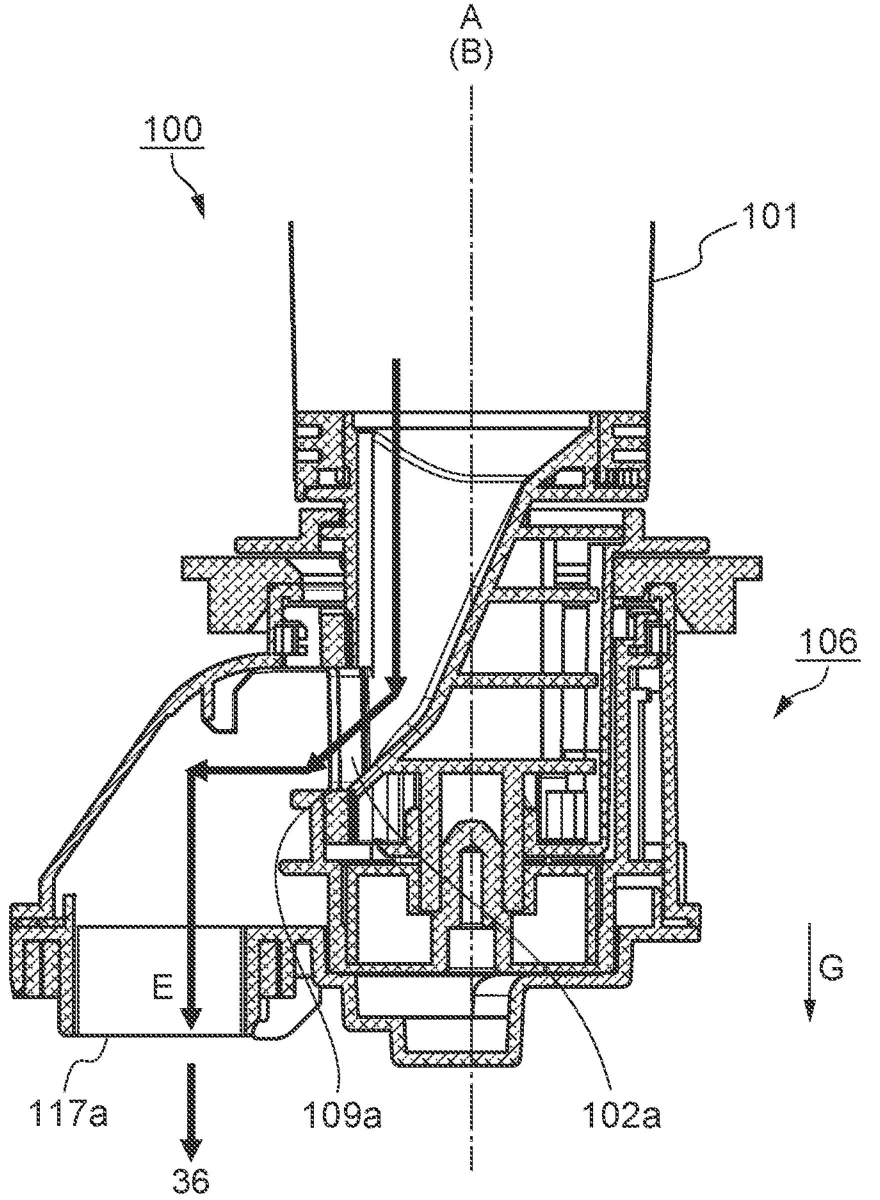
FIG. 9 is a cross-sectional view illustrating the toner receiving unit in a state where the toner pack is attached.

As illustrated in FIG. 8, the toner pack 100 with the container shutter 103 located at the third position is attached to the toner receiving unit 106 (attachment unit) with the main unit shutter 109 located at the first position (see FIG. 5A), in the attachment direction (direction of the arrow N). The direction of the rotational axis B of the main unit shutter 109 is the attachment direction of the toner pack 100. In this case, the positions of the opening 103*a* of the container shutter 103 and the concave portion 102*e* of the nozzle 102 are aligned with the position of a positioning portion 107*a* of the first frame 107 when viewed from the direction of the arrow N. At the same time, the toner pack 100 is attached while the position of an upstream region (first engaged portion) of the driven transfer portion 103*b* of the container shutter 103 in the attachment direction is aligned with the position of the drive transfer portion 108*a* of the operation lever 108. When the main unit shutter 109 is located at the first position, the discharge port 102*a* of the nozzle 102 (inside the storage unit 101) does not communicate with the reception port 117*a*.

When the concave portion 102*e* of the nozzle 102 is engaged with the positioning portion 107*a* of the first frame 107, the position of the nozzle 102 with respect to the first frame 107 in the rotational direction around the rotational axis A is determined.

Figure 1A:
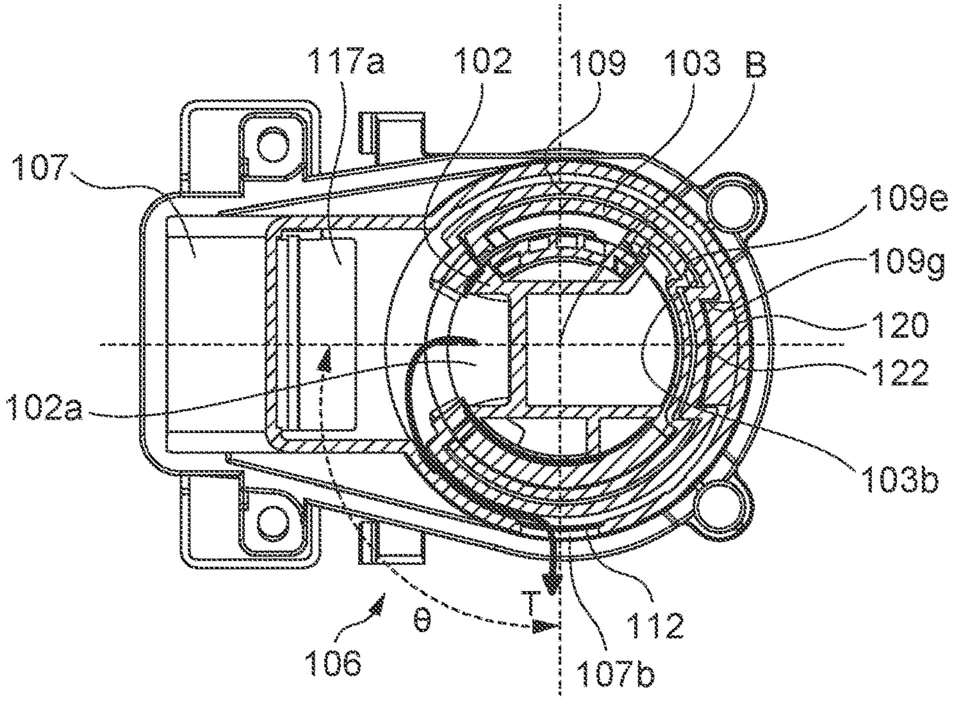
FIGS. 1A and 1B are cross-sectional views illustrating a toner receiving unit.

A downstream region (second engaging portion) of the driven transfer portion 103*b* of the container shutter 103 in the attachment direction also engages with the driven transfer portion 109*e* (second engaged portion) of the main unit shutter 109 (see FIGS. 1A, 4, and 8). More specifically, the rotational axis A of the container shutter 103 and the rotational axis B of the main unit shutter 109 become approximately coaxial. The operation lever 108, the container shutter 103, and the main unit shutter 109 are configured to be integrally rotatable around the rotational axis A (rotational axis B) with respect to the first frame 107 and the nozzle 102.

In a state where the toner pack 100 is attached to the toner receiving unit 106, the operation lever 108, the container shutter 103, and the main unit shutter 109 integrally rotate in the direction of the rotational axis A. More specifically, after the toner pack 100 is attached to the toner receiving unit 106 as illustrated in FIG. 9, the operating portion 108*b* of the operation lever 108 is rotated in the direction of the arrow D. Then, the main unit shutter 109 is moved from the first to the second position, and the container shutter 103 is moved from the third to the fourth position.

With the above-described operation, the storage unit 101 of the toner pack 100 communicates with the toner storage chamber 36 via the discharge port 102*a*, the main unit shutter opening 109*a*, and the reception port 117*a*.

<Toner Supply Operation with Toner Pack>

Figure 10A:
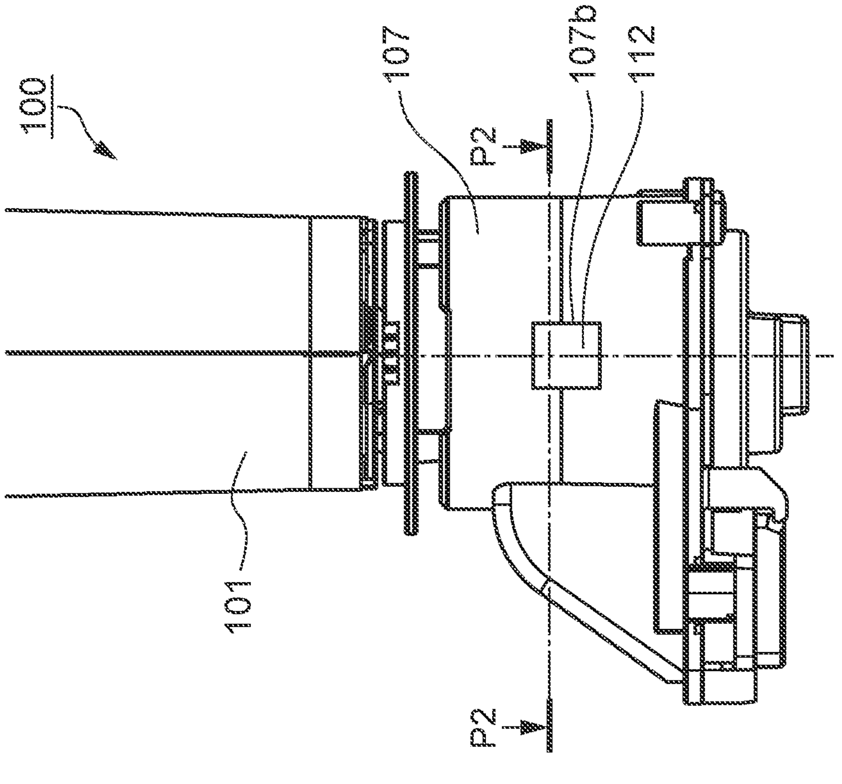
FIGS. 10A and 10B are side views illustrating the toner pack and the toner receiving unit, respectively, in a state where the toner pack has been attached.

A supply operation for supplying toner from the toner pack 100 attached to the toner receiving unit 106 of the image forming apparatus 1 will be described below with reference to FIGS. 10A and 10B. FIG. 10A illustrates the toner receiving unit 106 and the toner pack 100 in a state where the main unit shutter 109 in FIG. 9 enters the second position and the container shutter 103 is moved to the fourth position when viewed from a cross-section J. As illustrated in FIG. 9, the storage unit 101 of the toner pack 100 communicates with the toner storage chamber 36 via the discharge port 102*a*, the main unit shutter opening 109*a*, and the reception port 117*a* (flow path E). When the main unit shutter 109 is located at the second position, the discharge port 102*a* of the nozzle 102 (in the storage unit 101) communicates with the reception port 117*a*. When the user presses the storage unit 101 from the outside to deform the storage unit 101 to reduce the inner volume of the storage unit 101, the toner stored in the toner pack 100 and a part of air (not illustrated) pass through the flow path E and are supplied to the toner storage chamber 36.

The arrangement of the vent sheet 112 will be described in detail below. FIG. 10B is a side view illustrating the through-hole 107*b* and the vent sheet 112 provided on the toner receiving unit 106. FIG. 1A is a cross-sectional view illustrating the toner receiving unit 106 taken along the P2 section in FIG. 10A. FIG. 1A illustrates a state where the toner pack 100 is attached to the toner receiving unit 106, the container shutter 103 is located at the second position, and the main unit shutter 109 is located at the fourth position. In this state, the flow path E (see FIG. 9) as a communication path enables replenishing (supplying) toner. In other words, toner can be supplied from the storage unit 101 of the toner pack 100 to the toner storage chamber 36 via the reception port 117*a*. This state is defined as a toner replenishment (supply) state. When the main unit shutter 109 is located at the fourth position, the shielding member 120 fixed to the main unit shutter 109 is moved to a position where the vent sheet 112 is not shielded. Further, the discharge port 102*a* of the nozzle 102 communicates with up to the vent sheet 112. Therefore, the pressure, generated when the user presses the storage unit 101 (see FIGS. 10A and 10B) from the outside to deform the storage unit 101, causes a part of toner and at least a part of air to pass through the discharge port 102*a* and then reach the vent sheet 112 (path T). A part of the toner is collected by the vent sheet 112, and at least a part of the air passes through the vent sheet 112 and then is discharged out of the toner receiving unit 106. Most toner discharged from the discharge port 102*a* of the nozzle 102 passes through the flow path E and then is supplied to the toner storage chamber 36. The internal pressure rise of the toner storage chamber 36 caused by the pressure, generated when the user deforms the storage unit 101, is restricted when air is discharged from the vent sheet 112 of the through-hole 107*b*. This reduces the resistance in pressing the storage unit 101 of the toner pack 100, making it easier for the user to supply toner from the toner pack 100.

As illustrated in FIG. 1A, in a state where the toner pack 100 is attached to the toner receiving unit 106, the center of the through-hole 107*b* of the toner receiving unit 106 is deviated from the center of the discharge port 102*a* of the nozzle 102 by a rotational phase around the rotational axis B of θ degrees on a cross-section perpendicular to the rotational axis B. According to the present exemplary embodiment, θ is 90 degrees. However, the deviation is not limited to the example but desirably ranges from 45 to 180 degrees. More preferably, the deviation ranges from 90 to 180 degrees. Thus, the toner discharged from the discharge port 102*a* of the nozzle 102 hardly moves toward the through-hole 107*b* (vent sheet 112), providing an effect that the vent sheet 112 is hardly stained by toner.

Figure 1B:
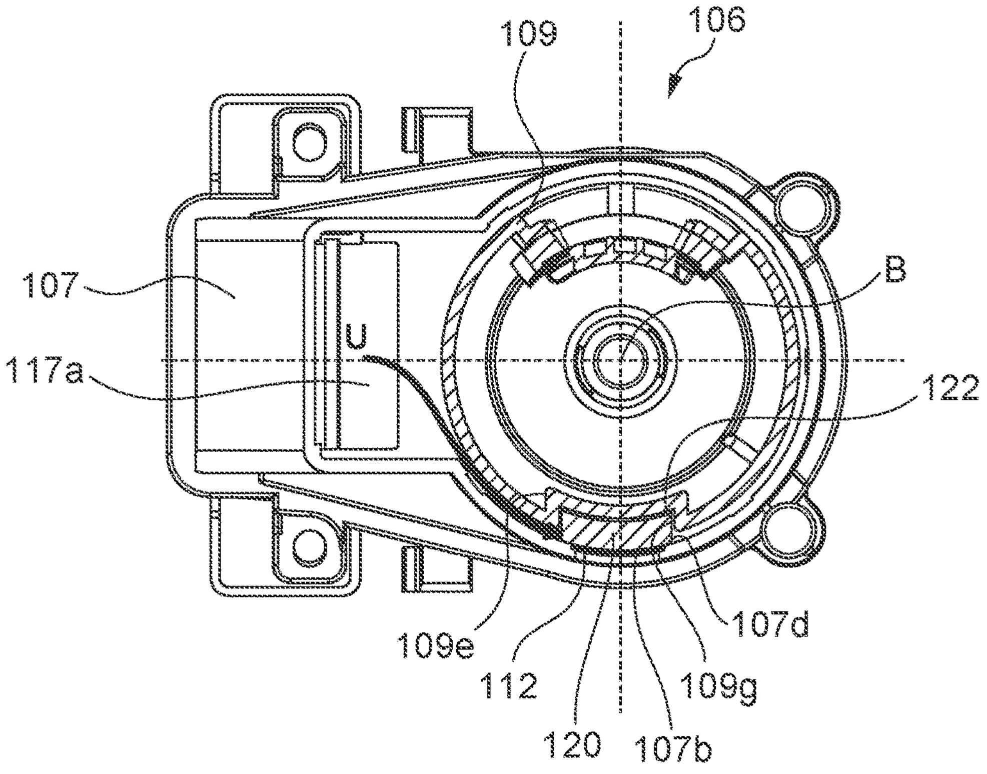
Figure 10B:
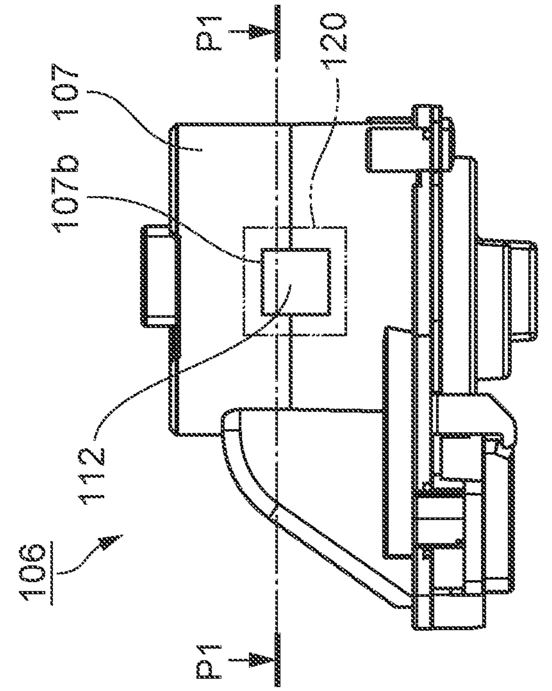

FIG. 1B is a cross-sectional view illustrating the toner receiving unit 106 taken along the P1 section in FIG. 10B. FIG. 1B illustrates a state where the toner pack 100 is not attached to the toner receiving unit 106, and the main unit shutter 109 is located at the third position. More specifically, the flow path E is shielded to disable the toner replenishment (supply). In other words, toner cannot be supplied to the toner storage chamber 36 via the reception port 117*a*. This state is defined as a toner replenishment (supply) disabled state. In this state, the main unit shutter 109 is located at the third position, and the shielding member 120 fixed to the main unit shutter 109 is located at a position for covering the vent sheet 112. According to the present exemplary embodiment, when the main unit shutter 109 is located at the third position, the shielding member 120 in a state of being compressed (elastically deformed) is in contact with the vent sheet 112. Because the vent sheet 112 is shielded by the shielding member 120 in this way, air is hardly discharged out of the toner receiving unit 106 via the vent sheet 112. The vent sheet 112 may be configured to be welded to the outer surface of the first frame 107, as described above. In this case, however, the shielding member 120 in a state of being compressed (elastically deformed) comes into contact with the inner surface of the first frame 107 of the through-hole 107*b*.

According to the present exemplary embodiment, the toner storage chamber 36 is filled with a fixed amount of toner in a state where the image forming apparatus 1 is a new apparatus. This is intended to enable the user to start printing immediately after installing the image forming apparatus 1.

When a vibration or impact is applied to the image forming apparatus 1 during the transportation process after the production of the image forming apparatus 1, toner stirred up in the toner storage chamber 36 may reach the vicinity of the vent sheet 112. According to the present exemplary embodiment, in the toner replenishment disabled state, a path U from the toner storage chamber 36 to the vicinity of the vent sheet 112 is not shielded but the vent sheet 112 is covered by the shielding member 120. Thus, the toner hardly reaches the vent sheet 112, preventing toner clogging on the vent sheet 112 during the transportation process. On the other hand, in the toner supply enabled state, the shielding member 120 is retracted to a position where the shielding member 120 does not shield the path T, and hence the vent sheet 112 exhibits its vent performance, thus preventing the internal pressure rise of the toner storage chamber 36. The material of the vent sheet 112 needs to be selected focusing on the vent performance while securing the minimum toner sealing performance in the toner supply enabled state. This enables increasing the degree of freedom of design.

The above descriptions are summed up as below. In the toner supply enabled state, the shielding member 120 is located at a position where the vent sheet 112 is exposed, thus preventing the internal pressure rise of the toner storage chamber 36 when the user supplies toner. On the other hand, in the replenishment disabled state, the shielding member 120 is located at a position where the shielding member 120 covers the vent sheet 112 to shield the path T, thus preventing toner clogging of the vent sheet 112 due to disturbances other than toner supply. This prevents toner clogging of the vent sheet 112 at timing other than toner supply, and provides an effect of securing sufficient vent performance of the vent sheet 112 during toner supply.

The present exemplary embodiment has been described above centering on a configuration in which the shielding member 120 moves in association with the rotation of the main unit shutter 109 in a state where the toner pack 100 is attached. However, the present invention is not limited to this configuration. A similar effect can be obtained with a configuration in which the movement of the shielding member 120 is associated with the attachment of the toner pack 100 to the toner receiving unit 106. For example, the shielding member 120 may be configured to be retracted from the vent sheet 112 upon attachment of the toner pack 100, and return to a position where the shielding member 120 shields the vent sheet 112 upon detachment of the toner pack 100.

A typical configuration disclosed in the present specification is summed up as below. A sign supplied to an element included in the following configuration indicates the correspondence with the element according to the above-described exemplary embodiment. This correspondence is to be considered as illustrative and does not limit each of the following elements to the configuration of each element of the present exemplary embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-181540, filed Nov. 14, 2022, which is hereby incorporated by reference herein in its entirety.

What is claimed is:

1. A development apparatus to and from which a toner container is attachable and detachable, the development apparatus comprising:

a developing roller;

a storage unit configured to store toner to be carried by the developing roller;

an attachment unit to and from which the toner container is attachable and detachable, and provided with a reception port for receiving toner from the toner container to the storage unit;

an opening through which an inside of the storage unit and an outside of the storage unit communicate with each other;

a filter configured to cover the opening, permit a passage of air and a passage of toner; and a main unit shutter movable between a non-communication position where an inside of the toner container attached to the attachment unit does not communicate with the reception port and a communication position where the inside of the toner container attached to the attachment unit communicates with the reception port, and configured to shield the opening when the main unit shutter is located at the non-communication position and open the opening when the main unit shutter is located at the communication position.

2. The development apparatus according to claim 1, wherein the main unit shutter includes a base member, and an elastic shielding member fixed to the base member, and wherein, when the main unit shutter is located at the non-communication position, the opening is shielded by the shielding member.

3. The development apparatus according to claim 2, wherein, when the main unit shutter is located at the non-communication position, the shielding member is elastically deformed in contact with the filter.

4. The development apparatus according to claim 1, wherein the main unit shutter is configured to be rotatable around a rotational axis.

5. The development apparatus according to claim 4, further comprising an operation lever configured to rotate the main unit shutter around the rotational axis, the operation lever being rotatable around the rotational axis, wherein the main unit shutter is configured to be rotated around the rotational axis together with the operation lever via a rotary member included in the toner container in a state where the toner container is attached to the attachment unit.

6. The image forming apparatus according to claim 5, wherein the image forming apparatus is configured to be unable to perform image formation in a state where the toner container is attached to the attachment unit.

7. An image forming system comprising:

(i) a toner container including a first storage unit configured to store toner, and a discharge unit provided with a discharge port through which the toner is discharged from the first storage unit out of the toner container; and (ii) an image forming apparatus including:

(u-i) a development unit including:

(ii-i-i) a developing roller;

(ii-i-ii) a second storage unit configured to store toner to be carried by the developing roller;

(ii-i-iii) an attachment unit to and from which the toner container is attachable and detachable, and provided with a reception port configured to receive toner from the toner container to the second storage unit;

(ii-i-iv) an opening through which an inside of the second storage unit and an outside of the second storage unit communicate with each other;

(ii-i-v) a filter configured to cover the opening, permit a passage of air and a passage of toner; and (ii-i-vi) a main unit shutter movable between a non-communication position where the discharge port of the discharge unit does not communicate with the reception port and a communication position where the discharge port of the discharge unit communicates with the reception port, and configured to shield the opening when the main unit shutter is located at the non-communication position and open the opening when the main unit shutter is located at the communication position.

8. The image forming system according to claim 7, wherein the main unit shutter is configured to be rotatable around the rotational axis.

9. The image forming system according to claim 8, wherein a direction of the rotational axis is an attachment direction in which the toner container is attached to the attachment unit.

10. The image forming system according to claim 8, wherein, in a state where the toner container is attached to the attachment unit, the opening is deviated in position from the discharge port of the discharge unit by a rotational phase around the rotational axis from 45 to 180 degrees on a section perpendicular to the rotational axis.

11. The image forming system according to claim 9, wherein the toner container includes a rotary member rotatable with respect to the discharge unit, and provided with a first engaged portion and a second engaging portion, wherein the image forming apparatus includes an operation lever rotatable around the rotational axis, and provided with a first engaging portion, and wherein the main unit shutter includes a second engaged portion, wherein, in a state where the toner container is attached to the attachment unit, the first engaging portion of the operation lever engages with the first engaged portion of the rotary member, and the second engaged portion of the main unit shutter engages with the second engaging portion of the rotary member, and wherein, when the operation lever is rotated around the rotational axis, the rotary member and the main unit shutter rotate.

12. The image forming system according to claim 11, wherein the rotary member is a container shutter rotating around the rotational axis, between a shielding position where the discharge port of the discharge unit is shielded and an open position where the discharge port is opened.

13. The image forming system according to claim 9, wherein the first storage unit of the toner container is a bag, and wherein, in a case where the toner container is attached to the attachment unit and the main unit shutter is located at the communication position, when the first storage unit of the toner container is pressed from an outside, toner stored in the first storage unit is discharged together with air through the discharge port of the discharge unit, the toner is supplied to the second storage unit via the reception port, and the air is discharged out of the development unit via the filter of the opening.

14. A development apparatus to and from which a toner container is attachable and detachable, the development apparatus comprising:

a developing roller;

a storage unit configured to store toner to be carried by the developing roller;

an attachment unit to and from which the toner container is attachable and detachable, and provided with a reception port configured to receive toner from the toner container to the storage unit;

an opening through which an inside of the storage unit and an outside of the storage unit communicate with each other, a filter configured to cover the opening; and a moving member configured to rotate between a shielding position where the opening is shielded and an open position where the opening is opened, and is located at the shielding position in a case where the toner container is not attached to the attachment unit, and is located at the open position at least when toner is receivable from the toner container to the storage unit via the reception port in a case where the toner container is attached to the attachment unit.

15. An image forming system comprising:

(i) a toner container including a first storage unit configured to store toner, and a discharge unit provided with a discharge port configured to discharge the toner from the first storage unit out of the toner container; and (ii) an image forming apparatus including:

(u-i) a development unit including:

(ii-i-i) a developing roller;

(ii-i-ii) a second storage unit configured to store toner to be carried by the developing roller;

(ii-i-iii) an attachment unit to and from which the toner container is attachable and detachable, and provided with a reception port configured to receive toner from the toner container to the second storage unit;

(ii-i-iv) an opening through which an inside of the second storage unit and an outside of the second storage unit communicate with each other;

(ii-i-v) a filter configured to cover the opening, permit a passage of air and disturb a passage of toner; and (ii-i-vi) a moving member configured to rotate between a shielding position where the opening is shielded and an open position where the opening is opened, and is located at the shielding position in a case where the toner container is not attached to the attachment unit, and is located at the open position at least when toner is receivable from the toner container to the storage unit via the reception port in a case where the toner container is attached to the attachment unit.

* * * * *